(12) United States Patent
Ha et al.

(10) Patent No.: US 11,522,183 B2
(45) Date of Patent: *Dec. 6, 2022

(54) RECHARGEABLE LITHIUM BATTERY (71) Applicant: Samsung SDI Co., Ltd., Yongin-si (KR)

(72) Inventors: Jaehwan Ha, Yongin-si (KR); Kijun Kim, Yongin-si (KR); Heeeun Yoo, Yongin-si (KR); Yeonhee Yoon, Yongin-si (KR); Kyuseo Lee, Yongin-si (KR); Dongmyung Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 168 days.

This patent is subject to a terminal disclaimer.

(21) Appl. No.: 16/862,779

(22) Filed: Apr. 30, 2020

(65) Prior Publication Data

US 2020/0350574 A1    Nov. 5, 2020

(30) Foreign Application Priority Data

May 3, 2019 (KR) .................. 10-2019-0052570

(51) Int. Cl.
*H01M 4/505* (2010.01)
*H01M 4/131* (2010.01)
(Continued)

(52) U.S. Cl.
CPC ........... *H01M 4/505* (2013.01); *H01M 4/131* (2013.01); *H01M 4/136* (2013.01); *H01M 4/525* (2013.01);
(Continued)

(58) Field of Classification Search
CPC ...... H01M 4/505; H01M 4/131; H01M 4/136; H01M 4/525; H01M 4/58; H01M 4/606; H01M 4/621
See application file for complete search history.

(56) References Cited

U.S. PATENT DOCUMENTS 5,582,931 A     12/1996   Kawakami
6,391,495 B1     5/2002   Choi et al.
(Continued)

FOREIGN PATENT DOCUMENTS

CN     1246736     3/2000
CN     1286507     3/2001
(Continued)

OTHER PUBLICATIONS

Ueda. JP 2018-106879A. Jul. 5, 2018. English machine translation by EPO. (Year: 2018).*

(Continued)

*Primary Examiner* — James Lee
(74) *Attorney, Agent, or Firm* — H.C. Park & Associates, PLC (57) ABSTRACT A rechargeable lithium battery includes an electrode laminate including a positive electrode including a positive current collector and a positive active material layer disposed on the positive current collector; a negative electrode including a negative current collector, a negative active material layer disposed on the negative current collector, and a negative electrode functional layer disposed on the negative active material layer; and a separator, wherein the electrode laminate has a ratio (L/W) of a height (L), which is a length in a protruding direction of an electrode terminal, relative to a width (W), which is perpendicular to the protruding direction of the electrode terminal and parallel to the laminate surface, is about 1.1 to about 2.3, the positive active material layer includes a first positive active material (Continued)

including at least one of a composite oxide of a metal selected from cobalt, manganese, nickel, and a combination thereof and lithium and a second positive active material including a compound represented by Chemical Formula 1, the negative electrode functional layer includes flake-shaped polyethylene particles, and an operation voltage is greater than or equal to about 4.3 V.

$$Li_aFe_{1-x1}M_{x1}PO_4 \quad \text{[Chemical Formula 1]}$$

In Chemical Formula 1, $0.90 \leq a \leq 1.8$, $0 \leq x1 \leq 0.7$, and M is Mn, Co, Ni, or a combination thereof.

17 Claims, 6 Drawing Sheets

(51) Int. Cl.
| | |
|---|---|
| H01M 4/136 | (2010.01) |
| H01M 4/525 | (2010.01) |
| H01M 4/58 | (2010.01) |
| H01M 4/60 | (2006.01) |
| H01M 4/62 | (2006.01) |
| H01M 50/46 | (2021.01) |
| H01M 4/02 | (2006.01) |

(52) U.S. Cl.
CPC .............. *H01M 4/58* (2013.01); *H01M 4/606* (2013.01); *H01M 4/621* (2013.01); *H01M 50/46* (2021.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 6,465,125 B1 | 10/2002 | Takami et al. |
| 6,475,678 B1 | 11/2002 | Isao |
| 6,511,517 B1 | 1/2003 | Ullrich et al. |
| 6,511,776 B1 | 1/2003 | Ryuji et al. |
| 10,476,082 B2 | 11/2019 | Jang et al. |
| 10,756,352 B2 | 8/2020 | Yoon et al. |
| 2001/0041289 A1 | 11/2001 | Hikmet et al. |
| 2002/0004169 A1 | 1/2002 | Yamada et al. |
| 2005/0079422 A1 | 4/2005 | Ko et al. |
| 2005/0221165 A1 | 10/2005 | Hennige et al. |
| 2005/0287442 A1 | 12/2005 | Kim et al. |
| 2006/0099495 A1 | 5/2006 | Suzuki et al. |
| 2007/0057228 A1* | 3/2007 | Huang ................. H01M 4/364 429/231.95 |
| 2007/0264577 A1 | 11/2007 | Katayama et al. |
| 2008/0241864 A1 | 10/2008 | Muraoka et al. |
| 2008/0292965 A1 | 11/2008 | Kubota et al. |
| 2009/0067119 A1 | 3/2009 | Katayama et al. |
| 2009/0253043 A1 | 10/2009 | Bak |
| 2010/0248026 A1 | 9/2010 | Hinoki et al. |
| 2010/0266905 A1 | 10/2010 | Jeon et al. |
| 2011/0003209 A1 | 1/2011 | Katayama et al. |
| 2011/0062378 A1 | 3/2011 | Chang et al. |
| 2012/0321948 A1 | 12/2012 | Oya et al. |
| 2013/0011747 A1 | 1/2013 | Sasaki et al. |
| 2013/0089794 A1 | 4/2013 | Kim |
| 2013/0236790 A1 | 9/2013 | Byun |
| 2013/0288093 A1 | 10/2013 | Nakagiri et al. |
| 2013/0335030 A1 | 12/2013 | Joe et al. |
| 2013/0337301 A1 | 12/2013 | Joe et al. |
| 2013/0346000 A1 | 12/2013 | Joe et al. |
| 2014/0014027 A1 | 1/2014 | Bischoff et al. |
| 2014/0138591 A1 | 5/2014 | Yoon et al. |
| 2014/0272489 A1 | 9/2014 | Anandan et al. |
| 2014/0322600 A1 | 10/2014 | Morita et al. |
| 2015/0050533 A1 | 2/2015 | Nam et al. |
| 2015/0221452 A1 | 8/2015 | Iida et al. |
| 2016/0104880 A1 | 4/2016 | Gao et al. |
| 2016/0141579 A1 | 5/2016 | Seok et al. |
| 2016/0268558 A1 | 9/2016 | Sawayama et al. |
| 2016/0285101 A1 | 9/2016 | Yoshio et al. |
| 2016/0322636 A1 | 11/2016 | Lee et al. |
| 2016/0351885 A1 | 12/2016 | Umehara |
| 2017/0170481 A1 | 6/2017 | Jang et al. |
| 2017/0187022 A1 | 6/2017 | Isozaki et al. |
| 2017/0229731 A1* | 8/2017 | Visco ................. H01M 50/403 |
| 2017/0288257 A1 | 10/2017 | Kil et al. |
| 2018/0040899 A1 | 2/2018 | Kuzuoka et al. |
| 2018/0083312 A1* | 3/2018 | Shiu ................... H01M 50/543 |
| 2018/0097218 A1 | 4/2018 | Komura |
| 2018/0145333 A1 | 5/2018 | Tokune et al. |
| 2018/0191027 A1 | 7/2018 | Ohara et al. |
| 2018/0294516 A1 | 10/2018 | Huang et al. |
| 2018/0331342 A1 | 11/2018 | Honda et al. |
| 2018/0375158 A1 | 12/2018 | Morinaka et al. |
| 2019/0123352 A1 | 4/2019 | Ko et al. |
| 2019/0123356 A1 | 4/2019 | Ko et al. |
| 2019/0140283 A1 | 5/2019 | Fukatani et al. |
| 2019/0229325 A1 | 7/2019 | Ahn et al. |
| 2019/0334157 A1 | 10/2019 | Seok et al. |
| 2019/0355952 A1 | 11/2019 | Yoon et al. |
| 2019/0383465 A1 | 12/2019 | Van Der et al. |
| 2020/0014027 A1 | 1/2020 | Ha et al. |
| 2020/0014078 A1 | 1/2020 | Ha et al. |
| 2020/0075955 A1 | 3/2020 | Jeon et al. |
| 2020/0127257 A1 | 4/2020 | Lee et al. |
| 2020/0194784 A1 | 6/2020 | Lee et al. |
| 2020/0350557 A1 | 11/2020 | Ha et al. |
| 2020/0350566 A1 | 11/2020 | Ha et al. |
| 2020/0350567 A1 | 11/2020 | Ha et al. |
| 2020/0350568 A1 | 11/2020 | Lee et al. |
| 2020/0350580 A1 | 11/2020 | Ha et al. |
| 2020/0350632 A1 | 11/2020 | Ha et al. |
| 2021/0074967 A1 | 3/2021 | Kim et al. |
| 2021/0074971 A1 | 3/2021 | Kim et al. |
| 2021/0074972 A1 | 3/2021 | Kim et al. |
| 2021/0074975 A1 | 3/2021 | Kwak et al. |
| 2021/0074979 A1 | 3/2021 | Kwak et al. |
| 2021/0074980 A1 | 3/2021 | Kim et al. |

FOREIGN PATENT DOCUMENTS

| | | |
|---|---|---|
| CN | 101048892 | 10/2007 |
| CN | 101783417 | 7/2010 |
| CN | 101847709 | 9/2010 |
| CN | 101478042 | 12/2010 |
| CN | 102280614 | 12/2011 |
| CN | 104393267 | 3/2015 |
| CN | 104466186 | 3/2015 |
| CN | 105977447 | 9/2016 |
| CN | 106848383 | 6/2017 |
| CN | 111883815 | 11/2020 |
| CN | 111883816 | 11/2020 |
| CN | 111883819 | 11/2020 |
| EP | 1079455 | 2/2001 |
| EP | 1826842 | 8/2007 |
| EP | 2581977 | 4/2013 |
| EP | 2838142 | 2/2015 |
| EP | 2874215 | 5/2015 |
| EP | 3024063 | 5/2016 |
| EP | 3386003 | 10/2018 |
| JP | 2000-277148 | 10/2000 |
| JP | 2001-135359 | 5/2001 |
| JP | 2004-111157 | 4/2004 |
| JP | 2005-123185 | 5/2005 |
| JP | 2008-305783 | 12/2008 |
| JP | 4977079 | 7/2012 |
| JP | 2012-221672 | 11/2012 |
| JP | 5110670 | 7/2014 |
| JP | 2015-115168 | 6/2015 |
| JP | 6197384 | 9/2017 |
| JP | 6271709 | 1/2018 |
| JP | 2018-106879 | 7/2018 |
| JP | 2018-147672 | 9/2018 |
| JP | 2018-156876 | 10/2018 |
| JP | 2018156876 | 10/2018 |
| JP | 2019-087464 | 6/2019 |

(56) References Cited

FOREIGN PATENT DOCUMENTS

| | | |
|---|---|---|
| KR | 10-2000-0056339 | 9/2000 |
| KR | 10-2005-0035074 | 4/2005 |
| KR | 10-2005-0035281 | 4/2005 |
| KR | 10-2005-0121172 | 12/2005 |
| KR | 10-2008-0073371 | 8/2008 |
| KR | 10-1205375 | 3/2009 |
| KR | 10-2009-0106841 | 10/2009 |
| KR | 10-2010-0081950 | 7/2010 |
| KR | 10-2013-0104088 | 9/2013 |
| KR | 10-2013-0105449 | 9/2013 |
| KR | 10-2013-0116170 | 10/2013 |
| KR | 10-2014-0068893 | 6/2014 |
| KR | 10-2015-0020022 | 2/2015 |
| KR | 10-2015-0050974 | 5/2015 |
| KR | 10-2015-0129181 | 11/2015 |
| KR | 10-2015-0143334 | 12/2015 |
| KR | 10-2016-0024776 | 3/2016 |
| KR | 10-2016-0025052 | 3/2016 |
| KR | 10-2016-0029176 | 3/2016 |
| KR | 10-2016-0066518 | 6/2016 |
| KR | 10-2016-0110076 | 9/2016 |
| KR | 10-2016-0117689 | 10/2016 |
| KR | 10-2017-0060515 | 6/2017 |
| KR | 10-2017-0094720 | 8/2017 |
| KR | 10-2017-0109285 | 9/2017 |
| KR | 10-2017-0113645 | 10/2017 |
| KR | 10-2018-0014192 | 2/2018 |
| KR | 10-2018-0037121 | 4/2018 |
| KR | 10-2018-0045724 | 5/2018 |
| KR | 10-2018-0049986 | 5/2018 |
| KR | 10-2018-0077190 | 7/2018 |
| KR | 10-2018-0081072 | 7/2018 |
| KR | 10-1876826 | 7/2018 |
| KR | 10-2018-0097036 | 8/2018 |
| KR | 10-2019-0043955 | 4/2019 |
| KR | 10-2019-0043957 | 4/2019 |
| KR | 10-2020-0044579 | 4/2020 |
| WO | 2006-132474 | 12/2006 |
| WO | 2011115247 | 7/2013 |
| WO | 2014-103792 | 7/2014 |
| WO | 2018-012821 | 1/2018 |

OTHER PUBLICATIONS

Notice of Allowance dated Sep. 2, 2021, issued to Korean Patent Application No. 10-2018-0160080.
Office Action dated Sep. 10, 2021, issued to U.S. Appl. No. 16/460,765.
Office Action dated Sep. 10, 2021, issued to U.S. Appl. No. 16/711,114.
Notice of Refusal dated Mar. 11, 2021, issued to Korean Patent Application No. 10-2018-0160080.
Grant of Patent dated Mar. 25, 2021, issued to Korean Patent Application No. 10-2018-0077138.
Grant of Patent dated Mar. 25, 2021, issued to Korean Patent Application No. 10-2018-0077139.
Office Action dated Apr. 12, 2021, issued to U.S. Appl. No. 16/460,779.
EPO Extended Search Report dated Nov. 7, 2019, for corresponding European Patent Application No. 19183958.8, (7 pages).
EPO Extended Search Report dated Nov. 7, 2019, corresponding to European Patent Application No. 19183919.0, (7 pages).
Extended European Search Report dated Aug. 3, 2020, issued to European Patent Application No. 20171859.0.
Extended European Search Report dated Aug. 3, 2020, issued to European Patent Application No. 20171551.3.
Extended European Search Report dated Aug. 3, 2020, issued to European Patent Application No. 20171450.8.
Extended European Search Report dated Aug. 3, 2020, issued to European Patent Application No. 20171833.5.
Extended European Search Report dated Aug. 3, 2020, issued to European Patent Application No. 20171846.7.
Extended European Search Report dated Aug. 3, 2020, issued to European Patent Application No. 20172132.1.
Final Office Action dated Oct. 22, 2021, issued to U.S. Appl. No. 16/460,779.
Advisory Action dated Nov. 17, 2021, issued to U.S. Appl. No. 16/460,765.
Extended European Search Report dated Oct. 19, 2020, issued to European Patent Application No. 20172161.
Office Action dated Mar. 4, 2021, issued to U.S. Appl. No. 16/460,765.
Office Action dated Nov. 9, 2021, issued to European Patent Application No. 19183919.0.
Advisory Action and AFCP Decision dated Jan. 6, 2022 issued to U.S. Appl. No. 16/460,779.
Office Action dated Jan. 26, 2022 and Search Reported dated Jan. 21, 2022, issued to Chinese Patent Application No. 201901595050.
Non-Final Office Action dated May 3, 2022, issued to U.S. Appl. No. 16/864,294.
Non-Final Office Action dated May 12, 2022, issued to U.S. Appl. No. 16/862,866.
Non-Final Office Action dated Apr. 1, 2022, issued to U.S. Appl. No. 16/864,384.
Office Action and Search Report dated Feb. 9, 2022, issued to Chinese Patent Application No. 201910594666.
Office Action dated Feb. 17, 2022, issued to U.S. Appl. No. 16/460,765.
Non-Final Office Action dated Apr. 27, 2022, issued to U.S. Appl. No. 16/862,638.
Non-Final Office Action dated Mar. 28, 2022, issued to U.S. Appl. No. 16/863,679.
Final Office Action dated Dec. 15, 2021, issued to U.S. Appl. No. 16/711,114.
Notice of Allowance dated Mar. 2, 2022, issued to U.S. Appl. No. 16/711,114.
Non-Final Office Action dated Jun. 28, 2022, issued to U.S. Appl. No. 16/864,858.
☐ Jing Wang, et al., "Thermal Synergy Effect between LiNi0.5Co0.2Mn0.3O2 and LiMn2O4 Enhances the Safety of Blended Cathode for Lithium Ion Batteries", ACS Appl. Mater. Interfaces 2016, 8, pp. 20147-20156 (Jul. 22, 2016).
☐ Notice of Allowance dated Jul. 11, 2022, of Korean Patent Application No. 10-2019-0052572.
☐ Notice of Allowance dated Jul. 11, 2022, of Korean Patent Application No. 10-2019-0052574.
☐ Office Action dated Jul. 13, 2022, of Korean Patent Application No. 10-2019-0052571.
☐ Notice of Allowance dated Jul. 13, 2022, of Korean Patent Application No. 10-2019-0052570.
☐ Office Action dated Jul. 13, 2022, of Korean Patent Application No. 10-2019-0052573.
☐ Notice of Allowance dated Jul. 13, 2022, of U.S. Appl. No. 16/460,779.
☐ Office Action dated Jul. 22, 2022, of European Patent Application No. 20172161.0.
☐ Notice of Allowance dated Jul. 20, 2022, of U.S. Appl. No. 16/863,679.
Notice of Allowance dated Aug. 1, 2022, of U.S. Appl. No. 16/864,384.
Office Action dated Aug. 23, 2022, of Chinese.Patent Application No. 201911266005.8.
Notice of Allowance dated Aug. 8, 2022, of U.S. Appl. No. 16/862,638.
Final Office Action dated Aug. 30, 2022, issued to U.S. Appl. No. 16/864,294.
Final Office Action dated Sep. 23, 2022, issued to U.S. Appl. No. 16/460,765.
Notice of Allowance dated Oct. 5, 2022, issued to Korean Patent Application No. 10-2019-0052569.
Notice of Allowance dated Oct. 5, 2022, issued to Korean Patent Application No. 10-2019-0052568.

* cited by examiner

Comparative Example 1

5s  11s  16s  22s

Comparative Example 2

RECHARGEABLE LITHIUM BATTERY

CROSS-REFERENCE TO RELATED APPLICATION

This application claims priority from and the benefit of Korean Patent Application No. 10-2019-0052570 filed on May 3, 2019, which is hereby incorporated by reference for all purposes as if fully set forth herein. Further, two related co-pending applications were filed on Jul. 2, 2019 with United States Patent and Trademark Office, as U.S. patent application Ser. No. 16/460,765 and U.S. patent application Ser. No. 16/460,779, both of which are hereby incorporated by reference for all purposes as if fully set forth herein, but are not admitted to be prior art with respect to the present invention by their mention in the cross-reference section.

BACKGROUND

Field

Exemplary embodiments/implementations of the invention relate generally to a rechargeable lithium battery.

Discussion of the Background

A portable information device such as a cell phone, a laptop, smart phone, and the like or an electric vehicle has used a rechargeable lithium battery having high energy density and easy portability as a driving power source. In addition, research on use of a rechargeable lithium battery as a power source for a hybrid or electric vehicle or a power storage by using high energy density characteristics has recently been actively made.

One of the main research tasks of such a rechargeable lithium battery is to improve the safety of the rechargeable battery. For example, if the rechargeable lithium battery is exothermic due to internal short circuit, overcharge and overdischarge, and the like, and an electrolyte decomposition reaction and thermal runaway phenomenon occur, an internal pressure inside the battery may rise rapidly to cause battery explosion. Among these, when the internal short circuit of the rechargeable lithium battery occurs, there is a high risk of explosion because the high electrical energy stored in each electrode is conducted in the shorted positive electrode and negative electrode.

In addition to the damage of the rechargeable lithium battery, the explosion may cause fatal damages to the user. Therefore, it is urgent to improve stability of the rechargeable lithium battery.

On the other hand, Lithium Iron Phosphate (LFP) is used as a low heat-generating safety material, but an average potential thereof is relatively low, accompanied by a decrease in capacity when discharging. Therefore, there is a need for technology development to improve these problems.

The above information disclosed in this Background section is only for understanding of the background of the inventive concepts, and, therefore, it may contain information that does not constitute prior art.

SUMMARY

Devices constructed/methods according to exemplary implementations embodiments of the invention are capable of being operated at high voltage and having high capacity and high stability.

According to one or more implementations/embodiments of the invention, a lithium battery includes a rechargeable an electrode laminate including a positive electrode including a positive current collector and a positive active material layer disposed on the positive current collector; a negative electrode including a negative current collector, a negative active material layer disposed on the negative current collector, and a negative electrode functional layer disposed on the negative active material layer; and a separator, wherein the electrode laminate has a ratio (L/W) of a height (L), which is a length in a protruding direction of an electrode terminal, relative to a width (W), which is perpendicular to the protruding direction of the electrode terminal and parallel to the laminate surface, is about 1.1 to about 2.3, the positive active material layer includes a first positive active material including at least one of a composite oxide of a metal selected from cobalt, manganese, nickel, and a combination thereof and lithium and a second positive active material including a compound represented by Chemical Formula 1, the negative electrode functional layer includes flake-shaped polyethylene particles, and an operation voltage is greater than or equal to about 4.3 V.

$$Li_aFe_{1-x1}M_{x1}PO_4 \qquad \text{[Chemical Formula 1]}$$

In Chemical Formula 1, $0.90 \leq a \leq 1.8$, $0 \leq x1 \leq 0.7$, and M is Mn, Co, Ni, or a combination thereof.

Safety may be achieved by implementing an early shutdown function as a rechargeable lithium battery that may operate at high voltages without degradation of capacity.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE EMBODIMENTS

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, referring to the drawings, embodiments of the present disclosure are described in detail. In the following description of the present disclosure, the well-known functions or constructions will not be described in order to clarify the present disclosure.

In order to clearly illustrate the present disclosure, the description and relationships are omitted, and throughout the disclosure, the same or similar configuration elements are designated by the same reference numerals. Also, since the size and thickness of each configuration shown in the drawing are arbitrarily shown for better understanding and ease of description, the present disclosure is not necessarily limited thereto.

A rechargeable lithium battery may be classified into a lithium ion battery, a lithium ion polymer battery, and a lithium polymer battery depending on kinds of a separator and an electrolyte. It also may be classified to be cylindrical, prismatic, coin-type, pouch-type, and the like depending on shape. In addition, it may be bulk type and thin film type depending on sizes. Structures and manufacturing methods for lithium ion batteries pertaining to this disclosure are well known in the art.

Figure 1:
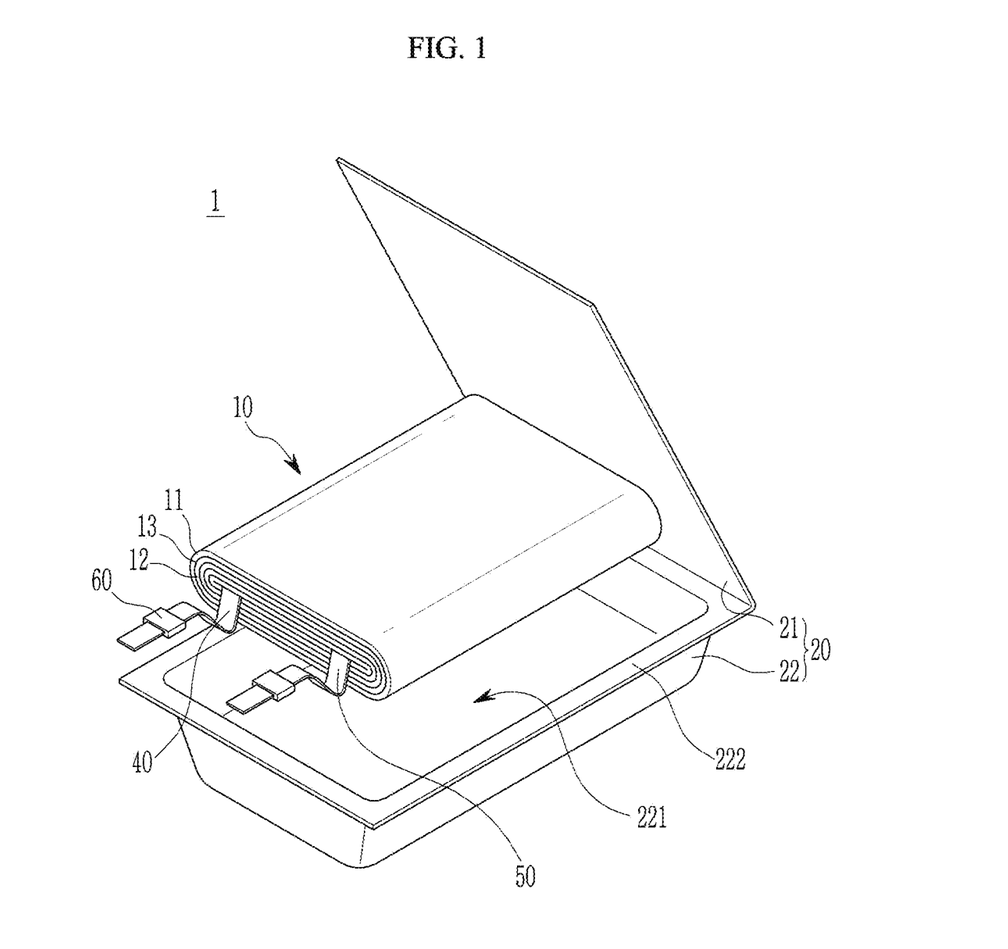
FIG. 1 schematically shows a structure of a rechargeable lithium battery according to an embodiment of the present disclosure.

Hereinafter, as an example of a rechargeable lithium battery, a pouch-type rechargeable lithium battery is for example described. FIG. 1 schematically shows a structure of a rechargeable lithium battery according to an embodiment. Referring to FIG. 1, a rechargeable lithium battery 1 according to an embodiment of the present disclosure may include a case 20, an electrode laminate 10 inserted into a case 20, and a positive electrode terminal 40 and a negative electrode terminal 50 that are electrically connected to the electrode laminate. The positive electrode terminal 40 and the negative electrode terminal 50 may be drawn out of the case 20 through tabs, respectively, and are respectively insulated from the case 20 by an insulation member 60.

As shown in FIG. 1, the electrode laminate 10 has a structure in which a positive electrode 11 and a negative electrode 12 of rectangular sheet shapes with predetermined sizes and a separator 13 is disposed therebetween are laminated and wound in one direction (jelly-roll type). Alternatively, although not shown, a plate-shaped positive electrode, a plate-shaped negative electrode, and a plate-shaped separator having predetermined sizes may be laminated, while the positive electrode and the negative electrode may be formed in a stacked (laminated) structure in which the separator is alternately stacked.

The electrode laminate 10 may include at least one positive electrode, at least one negative electrode, and at least one separator.

The case 20 may include a lower case 22 and an upper case 21, and the electrode laminate 10 may be accommodated in the inner space 221 of the lower case 22.

After the electrode laminate 10 is put in the case 20, a sealing material is applied to a sealing portion 222 disposed at the edge of the lower case 22 to seal the upper case 21 and the lower case 22.

In addition, the positive electrode 11, the negative electrode 12, and the separator 13 may be impregnated in the electrolyte.

The positive electrode 11 may include a positive current collector and a positive active material layer formed on the positive current collector. The positive electrode active material layer may include a positive active material, a positive electrode binder, and optionally a conductive material.

Hereinafter, a detailed configuration of the rechargeable lithium battery 1 according to an embodiment of the present disclosure is described.

The rechargeable lithium battery according to an embodiment of the present disclosure includes an electrode laminate including a positive electrode, a negative electrode, and a separator and the electrode laminate has a ratio (L/W) of a height (L), which is a length in a protruding direction of an electrode terminal, relative to a width (W), which is perpendicular to the protruding direction of the electrode terminal and parallel to the laminate surface, is about 1.1 to about 2.3.

Figure 2:
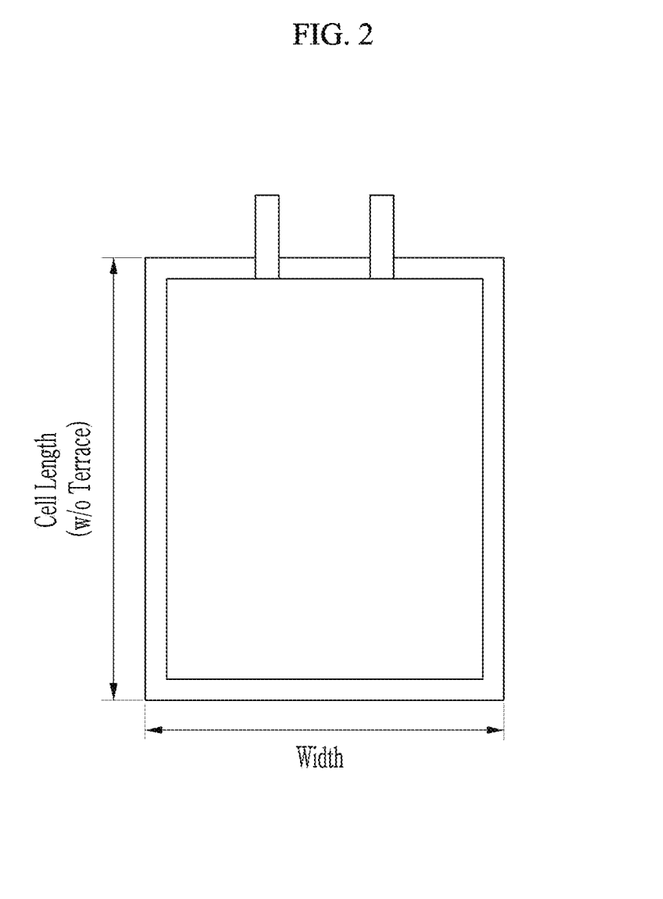
FIG. 2 is a schematic view of an electrode laminate according to an embodiment of the present disclosure.

In order to define the width and height of the electrode laminate, a schematic view of the electrode laminate is shown in FIG. 2.

FIG. 2 is a schematic view of an electrode laminate according to an embodiment of the present disclosure.

According to FIG. 2, the width (W) of the electrode laminate means a length perpendicular to a protruding direction of the electrode terminal and parallel to the laminate surface in the packaged electrode laminate. That is, in the packaged electrode laminate, it means the length of a surface in a direction in which the positive electrode, the negative electrode and the separator are laminated, and in a direction perpendicular to a protruding direction of the electrode terminal.

In addition, the height (L) of the electrode laminate means a length of the protruding direction of an electrode terminal in a packaged electrode laminate. In this case, a length extended by an electrode terminal, i.e., a negative electrode terminal and a positive electrode terminal is excluded.

When the ratio (L/W) of the height relative to the width of the electrode laminate satisfies 1.1 to 2.3, safety may be ensured when operating at a high voltage of greater than or equal to about 4.3 V.

The positive electrode includes a positive electrode current collector and a positive active material layer disposed on the positive current collector, and the positive active material layer includes a first positive active material and a second positive active material.

The first positive active material may include at least one of a composite oxide of a metal selected from cobalt, manganese, nickel, and a combination thereof and lithium and a second positive active material including a compound represented by Chemical Formula 1.

[Chemical Formula 1]

In Chemical Formula 1, 0.90≤a≤1.8, 0≤x1≤0.7, and M is Mn, Co, Ni, or a combination thereof.

The first positive active material is a high-capacity material having high energy density per unit amount and thus may minimize capacity deterioration during the operation at a high voltage of greater than or equal to about 4.3 V, and the second positive active material is a low heat-generating stability material and thus may secure stability. In other words, the first and second positive active materials are used together and thus may realize a high-capacity and high stability rechargeable battery.

Particularly, the rechargeable lithium battery according to an embodiment includes a positive electrode including the first positive active material and accordingly, may minimize capacity deterioration during the operation at a high voltage of greater than or equal to about 4.3 V and thus improve cycle-life characteristics.

The first positive active material may be included in a weight of about 80 wt % to about 97 wt %, and specifically about 80 wt % to about 95 wt %, for example about 85 to about 95 wt % or about 85 to about 94 wt % based on a total weight of the positive active material layer.

The positive active material layer may further include a positive electrode functional layer disposed on the positive active material layer.

For example, the first positive active material may be included in the positive active material layer and the second positive active material may be included in the positive electrode functional layer.

In this case, the first positive active material and the second positive active material may be included in a weight ratio of about 97:3 to about 80:20 or a weight ratio of about 95:5 to about 80:20.

For example, the first positive active material may be included in the positive active material layer, and the second positive active material may be included in the positive active material layer and the positive electrode functional layer, respectively.

In this case, the first positive active material and the second positive active material may be included in a weight ratio of about 94:6 to about 85:15.

In this case, the second positive active material of the positive electrode functional layer may be included in about 20 parts by weight to about 120 parts by weight based on 100 parts by weight of the second positive active material of the positive active material layer.

When the first positive active material and the second positive active material satisfy the above ranges, high capacity and safety may be secured.

The first positive active material may specifically include one of $LiCoO_2$, $Li_bM^1_{1-y1-z1}M^2_{y1}M^3_{z1}O_2$ ($0.9 \leq b \leq 1.8$, $0 \leq y1 \leq 1$, $0 \leq z1 \leq 1$, $0 \leq y1+z1 \leq 1$, $M^1$, $M^2$, and $M^3$ are independently a metal of Ni, Co, Mn, Al, Sr, Mg, or La), and a combination thereof.

For example, the first positive active material may include $LiCoO_2$, but is not limited thereto.

For example, $M^1$ may be Ni, and $M^2$ and $M^3$ may independently be a metal such as Co, Mn, Al, Sr, Mg, or La.

More specifically, $M^1$ may be Ni, $M^2$ may be Co, and $M^3$ may be Mn or Al, but are not limited thereto.

The second positive active material may include $LiFePO_4$.

The negative electrode may include a negative current collector, a negative active material layer disposed on the negative current collector, and a negative electrode functional layer disposed on the negative active material layer, and the negative electrode functional layer may include flake-shaped polyethylene particles.

When the flake-shaped polyethylene particles are used, a large area may be effectively blocked at a shut-down temperature, compared with spherical shape polyethylene particles. Accordingly, the negative electrode having the negative electrode functional layer including the flake-shaped polyethylene particles may also be included to more effectively implement the shut-down function and thus prevent an additional chemical reaction. This improves a rechargeable battery safety.

The polyethylene is generally HDPE (high density polyethylene, density: about 0.94 g/cc to about 0.965 g/cc), MDPE (medium density polyethylene, density: about 0.925 g/cc to about 0.94 g/cc), LDPE (low density polyethylene, density: about 0.91 g/cc to about 0.925 g/cc), VLDPE (very low density polyethylene, density: about 0.85 g/cc to about 0.91 g/cc), and the like.

The flake-shaped polyethylene particles may be used alone or in combination of two or more polyethylene polymers such as HDPE, MDPE, or LDPE.

The average particle size (D50) of the flake-shaped polyethylene particles included in the negative electrode functional layer disposed on the negative active material layer may be about 1 μm to about 8 μm, and specifically about 2 μm to about 6 μm.

As used herein, when a definition is not otherwise provided, the average particle size (D50) may be measured by a method well-known to a person of ordinary skill in the art, for example, as a particle size analyzer, or from TEM or SEM photographs. Alternatively, a dynamic light-scattering measurement device is used to perform a data analysis, and the number of particles is counted for each particle size range. From this, the D50 value may be easily obtained through a calculation.

More precisely, the particle size of a flake-shaped polyethylene particle may be determined by a dynamic light-scattering measurement method. Specifically, the size may be measured by ISO 13320 through the analysis of the light-scattering properties of the particles. For the non-spherical particles, a size distribution is reported, where the predicted scattering pattern for the volumetric sum of spherical particles matches the measured scattering pattern.

For example, the D50 is also known as the median diameter or the medium value of the particle size distribution, it is the value of the particle diameter at 50% in the cumulative distribution.

On the other hand, a ratio of the long axis length relative to the short axis length of the flake-shaped polyethylene particles may be about 1 to about 5, specifically about 1.1 to about 4.5, for example about 1.2 to about 3.5.

In addition, a thickness of the flake-shaped polyethylene particles may be about 0.2 μm to about 4 μm, specifically, about 0.3 μm to about 2.5 μm, for example may be about 0.3 μm to about 1.5 μm.

Figure 5:
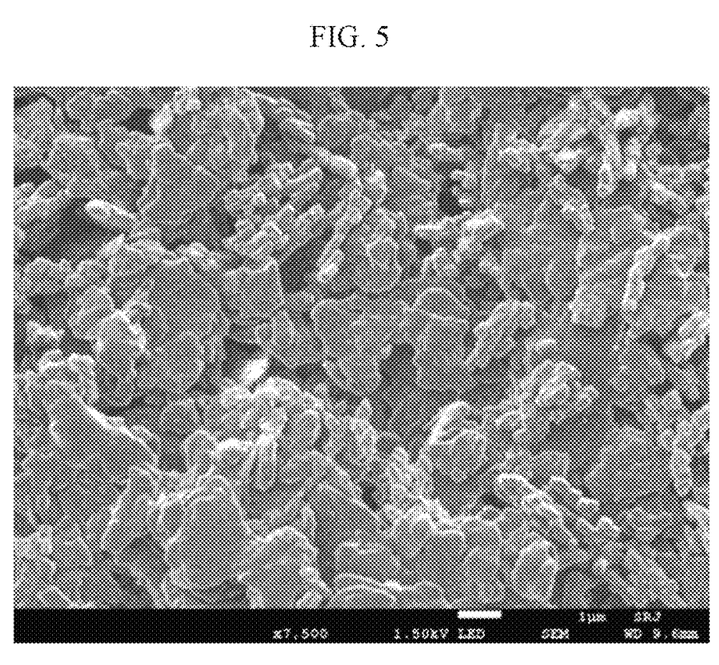
FIG. 5 is a SEM photograph of polyethylene particles of a negative electrode functional layer according to an embodiment.

The polyethylene particles according to this disclosure are flake-shaped, as seen in FIG. 5, and the average particle size may be defined as (D50) described above.

When the size and thickness of the flake-shaped polyethylene particles are within the above range, ion channels may be effectively closed even in a small amount.

When the negative electrode functional layer including the flake-shaped polyethylene particles is provided, a reaction rate may be increased according to temperature under the same reaction conditions, compared with the case of including spherical polyethylene particles, thereby improving stability of the rechargeable lithium battery. In the case of the flake-shaped polyethylene particles before melting, an area covering pores is thinner and wider than that of the spherical shape polyethylene particles before melting. When the polyethylene particles are melted at a predetermined temperature or more to close ion channels, a reaction rate is faster because the flake-shaped polyethylene particles have a larger area than that of the electrode plate closed by the melted spherical polyethylene particles.

That is, the polyethylene particles included in the negative electrode functional layer during thermal runaway of the battery is melted to close the ion channels, thereby limiting the movement of the ions to prevent additional electrochemical reactions by a shut-down function.

Figure 6:
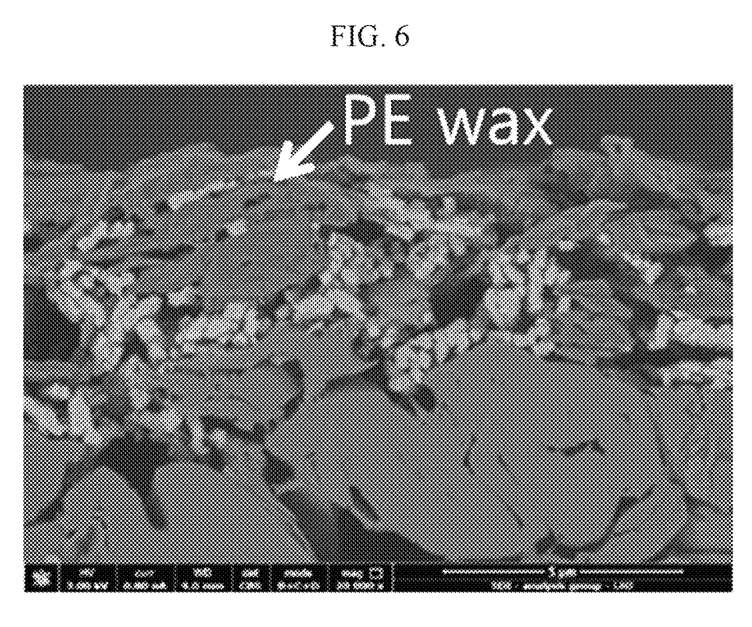
FIG. 6 is a SEM photograph of a negative electrode composition according to an embodiment.

For example, as shown in FIG. 6, since the flake-shaped polyethylene particles according to the embodiment are disposed in a thin and wide shape on the pores in a composition for the negative electrode functional layer, the flake-shaped polyethylene particles melts more rapidly during thermal runaway due to thermal/physical impact, thereby suppressing passage of ions.

On the other hand, the electrode laminate may have a volume of about 17.5 cc to about 30 cc but depending on uses, be manufactured into a unit cell having a volume of greater than or equal to about 30 cc.

In addition, the electrode laminate may have energy density of about 600 Wh/L to about 750 Wh/L.

The energy density corresponds to capacity of a rechargeable battery and may be obtained by dividing energy (Wh) of the rechargeable battery under a standard charge and discharge condition (e.g., charge at 0.5 C/discharge at 0.2 C) by a volume (L) of the rechargeable battery and then, standardizing the quotient.

For example, the energy density of the electrode laminate may be in a range of about 630 Wh/L to about 720 Wh/L or about 650 Wh/L to about 690 Wh/L.

The rechargeable battery according to an embodiment includes an electrode laminate having energy density within the range and thus may realize a high voltage and high capacity.

The rechargeable battery according to an embodiment for example may have an operation voltage of about 4.3 V to about 4.5 V.

The positive active material layer may optionally further include a positive electrode conductive material and a positive electrode binder.

The amount of the positive electrode conductive material and the positive electrode binder may be about 1 wt % to about 7 wt % based on a total weight of the positive active material layer, respectively.

The positive electrode conductive material is used to impart conductivity to the positive electrode, and may be used as long as it is an electron conductive material without causing chemical change in the battery. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The positive electrode binder adheres positively to positive active material particles, and also serves to adhere positive active materials to a current collector well. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

As the positive current collector, aluminum, nickel, and the like may be used, but is not limited thereto.

The electrolyte includes a non-aqueous organic solvent and a lithium salt.

The non-aqueous organic solvent serves as a medium for transporting ions taking part in the electrochemical reaction of a battery.

The non-aqueous organic solvent may include a carbonate-based, ester-based, ether-based, ketone-based, alcohol-based, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like and the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like and the ketone-based solvent may include cyclohexanone, and the like. The alcohol-based solvent include ethyl alcohol, isopropyl alcohol, and so on, and examples of the aprotic solvent include nitriles such as R—CN (wherein R is a $C_2$ to $C_{20}$ linear, branched, or cyclic hydrocarbon group that may include a double bond, an aromatic ring, or an ether bond), amides such as dimethylformamide, dioxolanes such as 1,3-dioxolane, sulfolanes, and so on.

The non-aqueous organic solvent may be used alone or in a mixture of two or more. When the organic solvent is used in a mixture, the mixture ratio can be controlled in accordance with a desirable battery performance.

The carbonate-based solvent may include a mixture of a cyclic carbonate and a chain carbonate. The cyclic carbonate and the chain carbonate are mixed together at a volume ratio of about 1:1 to about 1:9, and when the mixture is used as an electrolyte, the electrolyte performance may be enhanced.

The non-aqueous organic solvent of the present disclosure may further include an aromatic hydrocarbon-based organic solvent in addition to the carbonate-based solvent. In this case, the carbonate-based solvent and the aromatic hydrocarbon-based organic solvent may be mixed in a volume ratio of about 1:1 to about 30:1.

As the aromatic hydrocarbon-based organic solvent, an aromatic hydrocarbon-based compound of Chemical Formula 2 may be used.

[Chemical Formula 2]

In Chemical Formula 2, $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of Chemical Formula 3 in order to improve cycle-life of a battery.

[Chemical Formula 3]

In Chemical Formula 3, $R_7$ and $R_8$ may be the same or different and may be selected from hydrogen, a halogen group, a cyano group (CN), a nitro group ($NO_2$), and a fluorinated C1 to C5 alkyl group, wherein at least one of $R_7$ and $R_8$ is selected from a halogen group, a cyano group (CN), a nitro group ($NO_2$), and a fluorinated C1 to C5 alkyl group, provided that $R_7$ and $R_8$ are not both hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the cycle-life improvement additive may be used within an appropriate range.

The lithium salt dissolved in an organic solvent supplies a battery with lithium ions, basically operates the rechargeable lithium battery, and improves transportation of the lithium ions between a positive electrode and a negative electrode. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein, x and y are natural numbers, LiCl, LiI, and $LiB(C_2O_4)_2$ (lithium bis(oxalato) borate, LiBOB). A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The negative electrode functional layer may further include inorganic particles and a binder.

A sum weight of the flake-shaped polyethylene particles and the inorganic particles: a weight of the binder may be a weight ratio of about 80:20 to about 99:1, and specifically, a weight ratio of about 85:15 to about 97:3.

The flake-shaped polyethylene particles and the inorganic particles may be included in a weight ratio of about 95:5 to about 10:90, and specifically in a weight ratio of about 70:30 to about 30:70.

The amounts of the flake-shaped polyethylene particles and the inorganic particles within the above range, may secure cycle-life characteristics and output characteristics of a battery.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. Organic particles such as an acrylic compound, an imide compound, an amide compound, or a combination thereof may be further included in addition to the inorganic particles, but are not limited thereto.

The inorganic particles may be spherical, flake-shaped, cubic, or amorphous. The inorganic particles may have an average particle diameter (D50) of about 1 nm to about 2500 nm, for example about 100 nm to about 2000 nm, about 200 nm to about 1500 nm, or about 300 nm to about 1500 nm. The average particle diameter of the inorganic particle may be an average particle size ($D_{50}$) at a volume ratio of 50% in a cumulative size-distribution curve.

The negative electrode functional layer may have a thickness of about 1 μm to about 10 μm, and specifically about 3 μm to about 10 μm.

In addition, a ratio of the thickness of the negative active material layer to the thickness of the negative electrode functional layer may be about 50:1 to about 10:1, and specifically about 30:1 to about 10:1.

The thickness of the negative electrode functional layer within the above range, may significantly improve the thermal stability while maintaining excellent cycle-life characteristics.

In particular, the ratio of the thickness of the negative electrode functional layer in the above range, may improve thermal safety while minimizing the decrease in energy density.

The negative current collector may include one selected from a copper foil, a nickel foil, a stainless steel foil, a titanium foil, a nickel foam, a copper foam, a polymer substrate coated with a conductive metal, and a combination thereof.

The negative active material may include a material that reversibly intercalates/deintercalates lithium ions, a lithium metal, a lithium metal alloy, a material capable of doping/dedoping lithium, or a transition metal oxide.

Examples of the material capable of reversibly intercalating/deintercalating the lithium ions may include a carbonaceous material, that is, a carbon-based negative active material generally used in a rechargeable lithium battery. Examples of the carbon-based negative active material may be crystalline carbon, amorphous carbon, or a combination thereof. The crystalline carbon may be graphite such as non-shaped, sheet-shaped, flake-shaped, spherical shape, or fiber shaped natural graphite or artificial graphite, and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a silicon-based or tin-based material, for example, Si, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Sn), a Sn-carbon composite and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include a lithium titanium oxide.

In the negative active material layer, an amount of the negative active material is about 95 wt % to about 99 wt % based on a total weight of the negative active material layer.

The negative active material layer may optionally further include a negative electrode conductive material and a negative electrode binder.

Each amount of the negative electrode conductive material and negative electrode binder may be about 1 wt % to about 5 wt % based on a total weight of the negative active material layer.

The negative electrode conductive material is used to impart conductivity to the negative electrode, and types of the negative electrode conductive material is the same as types of the positive electrode conductive material described above.

The negative electrode binder improves binding properties of negative active material particles with one another and with a current collector. The negative electrode binder may be a non-water-soluble binder, a water-soluble binder, an amphiphilic binder (water-soluble/non-water-soluble binder), or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a $C_2$ to $C_8$ olefin, a copolymer of (meth)acrylic acid and (meth)acrylic acid alkyl ester, or a combination thereof.

The amphiphilic binder may be an acrylated styrene-based rubber.

When the water-soluble binder is used as a negative electrode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metals may be Na, K, or Li. The thickener may be included in about 0.1 parts by weight to about 3 parts by weight based on 100 parts by weight of the negative active material.

The rechargeable lithium battery according to an embodiment of the present disclosure simultaneously includes a positive active material layer including the first and second positive active materials along with the negative electrode functional layer including the flake-shaped polyethylene particles and disposed on the negative electrode and accordingly, may minimize the capacity deterioration and lower a heat-increasing rate due to thermal/physical impacts and thus effectively exhibit a shut-down effect.

On the other hand, the separator 13 may be disposed between the positive electrode 11 and the negative electrode 12 as described above. The separator 13 may be, for example, selected from a glass fiber, polyester, polyethylene, polypropylene, polytetrafluoroethylene, or a combination thereof. It may have a form of a non-woven fabric or a woven fabric. For example, in a rechargeable lithium battery, a polyolefin-based polymer separator such as polyethylene and polypropylene is mainly used. In order to ensure the heat resistance or mechanical strength, a coated separator including a ceramic component or a polymer material may be used. Optionally, it may have a mono-layered or multi-layered structure.

Hereinafter, the above aspects of the present disclosure are illustrated in more detail with reference to examples. However, these examples are exemplary, and the present disclosure is not limited thereto.

(Manufacture of Rechargeable Lithium Battery Cells)

Example 1

95 wt % of a positive active material prepared by mixing $LiCoO_2/LiFePO_4$ in a weight ratio of 9:1 as first/second positive active materials, 3 wt % of a polyvinylidene fluoride binder, and 2 wt % of a ketjen black conductive material were mixed in an N-methylpyrrolidone solvent to prepare positive active material slurry. The positive active material slurry was coated on an aluminum current collector and then, dried and compressed to manufacture a positive electrode having a positive active material layer.

98 wt % of graphite, 0.8 wt % of carboxylmethyl cellulose, and 1.2 wt % of a styrene-butadiene rubber were mixed in pure water to prepare negative active material slurry. The negative active material slurry was coated on both surfaces of a copper current collector and then, dried and compressed to manufacture a negative electrode having a negative active material layer.

48 wt % of 2 μm flake-shaped PE particles (a long axis length/a short axis length=about 2, a thickness=about 0.6 μm), 47 wt % of alumina (an average particle diameter (D50)=1.2 μm), and 5 wt % of an acrylated styrene-based rubber binder were mixed in an alcohol-based solvent to prepare PE/alumina slurry.

The PE/alumina slurry was coated on both of the surfaces of the negative electrode and then, dried and compressed to manufacture a negative electrode having a coating layer including the flake-shaped PE particles.

The negative electrode/a separator/the positive electrode/a separator were laminated in order to form a jelly roll-shaped electrode laminate (L/W of an electrode laminate=2.3).

This jelly roll-shaped electrode laminate and an electrolyte (1.0 M $LiPF_6$ in EC/DEC=50:50 v/v) were put in a battery case and sealed to manufacture a pouch cell.

Example 2

A rechargeable lithium battery cell was manufactured according to the same method as Example 1 except that L/W of the electrode laminate was changed into 1.1.

Comparative Example 1

A rechargeable lithium battery cell was manufactured according to the same method as Example 1 except that L/W of the electrode laminate was changed into 2.5.

Comparative Example 2

A rechargeable lithium battery cell was manufactured according to the same method as Example 1 except that L/W of the electrode laminate was changed into 1.

Evaluation Example: Penetration Safety Evaluation

Each ten rechargeable battery cells according to Examples 1 and 2 and Comparative Examples 1 and 2 were manufactured, and a penetration safety evaluation thereof was performed.

The penetration safety evaluation was performed by charging the rechargeable lithium battery cells of Examples 1 and 2 and Comparative Examples 1 and 2 at 0.5 C and 4.3 V under a cut-off of 0.05 C and one hour later, penetrated with a pin having a diameter of 3 mm at 80 Mm/sec, and the results are examined.

Figure 3:
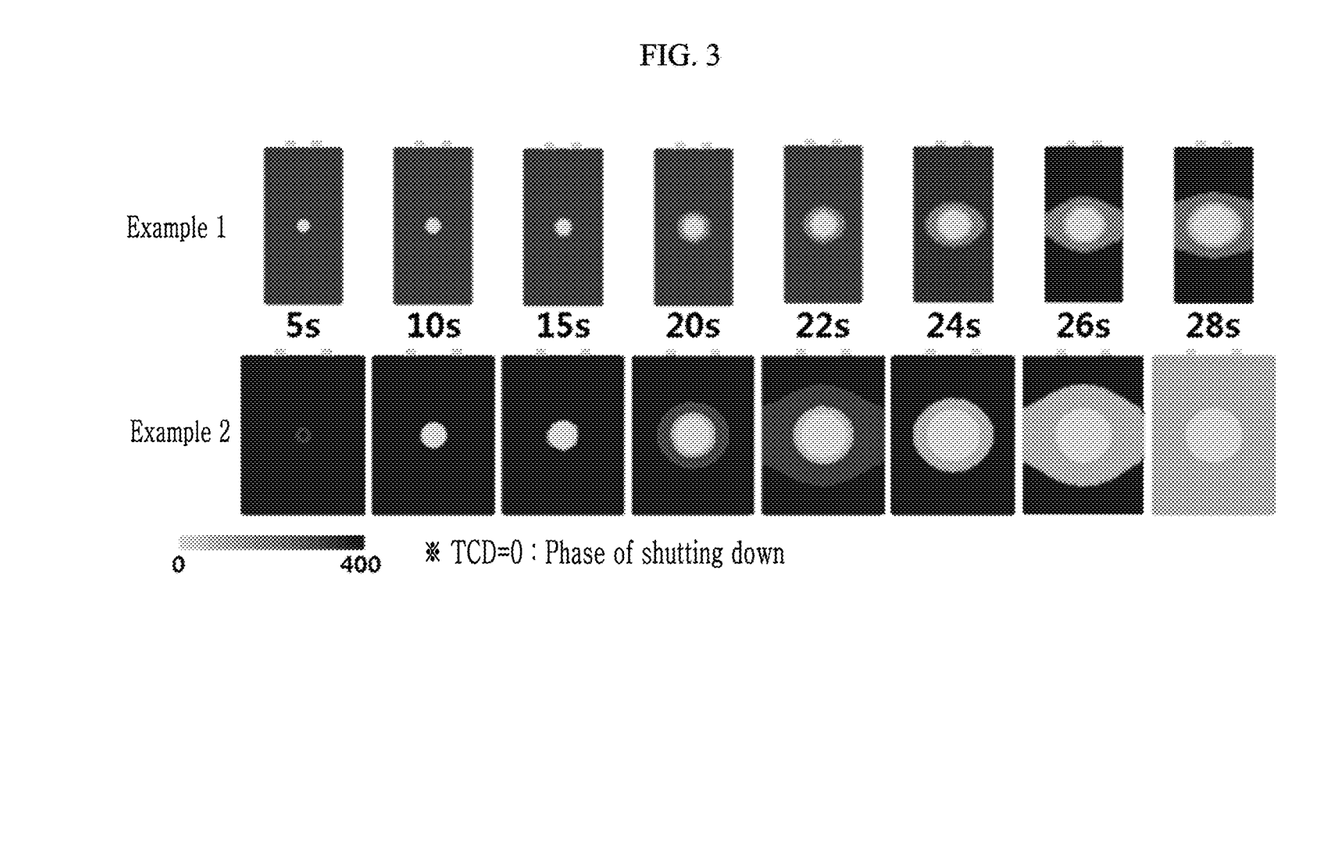
FIG. 3 shows heat transfer simulation results over time during penetration safety evaluation for the rechargeable lithium battery cells according to Examples 1 and 2 of the present disclosure.
Figure 4:
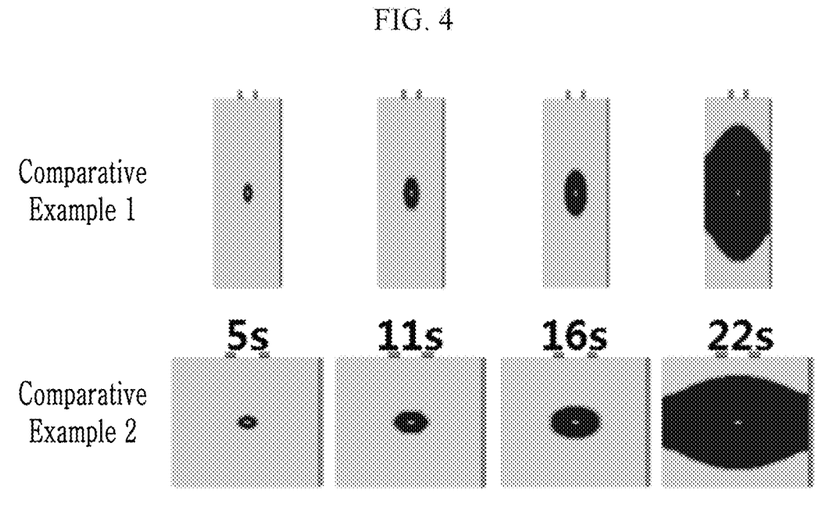
FIG. 4 shows heat transfer simulation results over time during penetration safety evaluation for the rechargeable lithium battery cells according to Comparative Examples 1 and 2.

While the penetration safety evaluation was performed, a heat transfer simulation of the rechargeable lithium battery cells were conducted, and the results are shown in FIGS. 3 and 4.

FIG. 3 shows heat transfer simulation results over time during penetration safety evaluation for the rechargeable lithium battery cells according to Examples 1 and 2 of the present disclosure.

FIG. 4 shows heat transfer simulation results over time during penetration safety evaluation for the rechargeable lithium battery cells according to Comparative Examples 1 and 2.

Referring to FIG. 3, in the rechargeable lithium battery cells having L/W in a range of 1.1 to 2.3, the heat transfer was smoothly performed during the penetration and led to an early shut-down before explosion/ignition of the battery cells and thus might secure penetration safety.

On the contrary, referring to FIG. 4, in the rechargeable lithium battery cells having L/W of less than 1.1 or L/W of greater than 2.3, the heat transfer was not smoothly performed and might fail in leading the early shut-down and cause explosion/ignition of the battery cells. In other word, when L/W did not satisfy the range of 1.1 to 2.3, the heat transfer was not smoothly performed, and accordingly, safety was not secured.

On the other hand, the penetration safety evaluation results of the rechargeable lithium battery cells of Examples 1 and 2 and Comparative Examples 1 and 2 are shown in Table 1. In Table 1, the numbers refer to the number of battery cells in which non-ignition, smoke generation, and ignition occurred.

TABLE 1

|  | L/W | Non-ignition | Smoke generation | Ignition |
|---|---|---|---|---|
| Example 1 | 2.3 | 10 | 0 | 0 |
| Example 2 | 1.1 | 10 | 0 | 0 |
| Comparative Example 1 | 2.5 | 5 | 2 | 3 |
| Comparative Example 2 | 1.0 | 5 | 2 | 3 |

As shown in Table 1, as for the battery cells of Examples 1 and 2 having a length relative to width ratio (L/W) of an electrode laminate in a range of 1.1 to 2.3, the heat was transferred all over the electrode laminate in the penetration test, thus securing excellent safety.

However, the battery cells of Comparative Examples 1 and 2 did not satisfy L/W of 1.1 to 2.3 and hardly secured penetration safety and accordingly, Examples 1 and 2 exhibited much excellent safety compared with the battery cells of Comparative Examples 1 and 2.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A rechargeable lithium battery, comprising:
an electrode laminate comprising:
a positive electrode comprising:
a positive current collector; and
a positive active material layer disposed on the positive current collector;
a negative electrode comprising:
a negative current collector;
a negative active material layer disposed on the negative current collector; and
a negative electrode functional layer disposed on the negative active material layer; and
a separator,
wherein the electrode laminate has a ratio (L/W) of a height (L), which is a length in a protruding direction of the electrode terminal, relative to a width (W), which is perpendicular to the protruding direction of the electrode terminal and parallel to the laminate surface, ranges between about 1.1 and about 2.3,
wherein the positive active material layer comprises:
a first positive active material comprising at least one of a composite oxide of a metal selected from cobalt, manganese, nickel, and a combination thereof and lithium; and
a second positive active material comprising a compound represented by Chemical Formula 1,
wherein the negative electrode functional layer comprises:
flake-shaped polyethylene particles, wherein a ratio of the long axis length relative to the short axis length of the flake-shaped polyethylene particles is 1.1 to 4.5, and the flake-shaped polyethylene particles do not include spherical polyethylene particles, and
wherein an operation voltage is greater than or equal to about 4.3 V, $$Li_aFe_{1-x1}M_{x1}PO_4 \qquad \text{[Chemical Formula 1]}$$

wherein, 0.90≤a≤1.8, 0≤x1≤0.7, and M is Mn, Co, Ni, or a combination thereof.

2. The rechargeable lithium battery of claim 1, wherein the electrode laminate has a volume of about 17.5 cc to about 30 cc.

3. The rechargeable lithium battery of claim 1, wherein the electrode laminate has an energy density of about 600 Wh/L to about 750 Wh/L.

4. The rechargeable lithium battery of claim 1, wherein the operation voltage is about 4.3 V to about 4.5 V.

5. The rechargeable lithium battery of claim 1, wherein the first positive active material is included in about 80 wt % to about 97 wt % based on a total weight of the positive active material layer.

6. The rechargeable lithium battery of claim 1, wherein the first positive active material and the second positive active material are included in a weight ratio of about 97:3 to about 80:20.

7. The rechargeable lithium battery of claim 1, wherein the positive active material layer further comprises:
a positive electrode functional layer disposed on the positive active material layer.

8. The rechargeable lithium battery of claim 7, wherein the first positive active material is included in the positive active material layer, and
the second positive active material is included in at least one of the positive active material layer and the positive electrode functional layer.

9. The rechargeable lithium battery of claim 1, wherein the first positive active material comprises $Li_bM^1_{1-y1-z1}M^2_{y1}M^3_{z1}O_2$ (0.9≤b≤1.8, 0≤y1≤1, 0≤z1≤1, 0≤y1+z1≤1, $M^1$, $M^2$, and $M^3$ are independently a metal of Ni, Co, Mn, Al, Sr, Mg, or La).

10. The rechargeable lithium battery of claim 1, wherein the second positive active material comprises $LiFePO_4$.

11. The rechargeable lithium battery of claim 1, wherein an average particle size (D50) of the flake-shaped polyethylene particles is about 1 μm to about 8 μm.

12. The rechargeable lithium battery of claim 1, wherein a ratio of the long axis length relative to the short axis length of the flake-shaped polyethylene particles is about 1.2 to about 3.5.

13. The rechargeable lithium battery of claim 1, wherein a thickness of the flake-shaped polyethylene particles is about 0.2 μm to about 4 μm.

14. The rechargeable lithium battery of claim 1, wherein the negative electrode functional layer further comprises inorganic particles and a binder.

15. The rechargeable lithium battery of claim 14, wherein a sum weight of the flake-shaped polyethylene particles and the inorganic particles over a weight of the binder is about 80:20 to about 99:1 by weight.

16. The rechargeable lithium battery of claim 14, wherein the flake-shaped polyethylene particles and the inorganic particles are included in a weight ratio of about 95:5 to about 10:90.

17. The rechargeable lithium battery of claim 1, wherein the negative electrode functional layer has a thickness of about 1 μm to about 10 μm.

* * * * *